Figure 2:
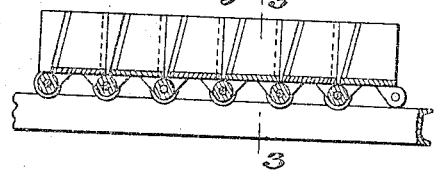
Figure 3:
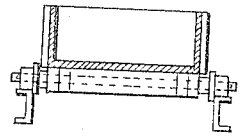
Figure 4:
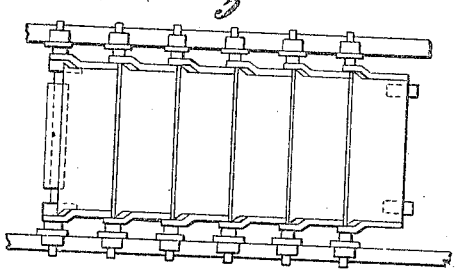
Figure 1:
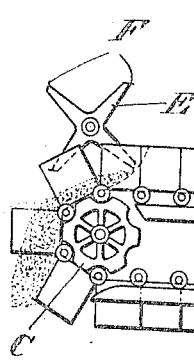
Figure 1:
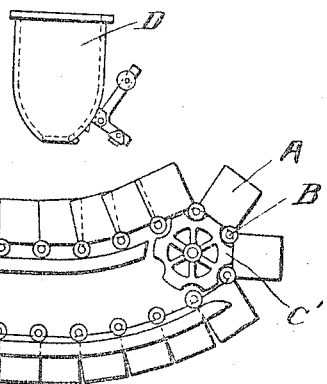

G. A. BRUHN.
PROCESS OF AND APPARATUS FOR AGEING AND DISINTEGRATING SUPERPHOSPHATED MASSES.
APPLICATION FILED NOV. 19, 1920.

1,430,621. Patented Oct. 3, 1922.

Inventor
Gustav A. Bruhn
By Knight Bros
Attys

Patented Oct. 3, 1922.

1,430,621

UNITED STATES PATENT OFFICE.

GUSTAV A. BRUHN, OF HARBURG-ON-THE-ELBE, GERMANY, ASSIGNOR TO FRIED. KRUPP AKTIENGESELLSCHAFT, OF ESSEN-ON-THE-RUHR, GERMANY.

PROCESS OF AND APPARATUS FOR AGEING AND DISINTEGRATING SUPERPHOSPHATE MASSES.

Application filed November 19, 1920. Serial No. 425,263.

*To all whom it may concern:*

Be it known that I, GUSTAV A. BRUHN, residing at Harburg-on-the-Elbe, Germany, a citizen of the German Empire, have invented a certain new and useful Improvement in Processes of and Apparatus for Ageing and Disintegrating Superphosphate Masses (for which I have filed an application in Germany, July 28, 1915), of which the following is a specification.

The present apparatus, which serves preferably for the manufacture of superphosphate, while avoiding the use in such manufacture of the hitherto customary separate ageing chambers, permits the paste of crude phosphate and sulphuric acid let down out of the stirring apparatus to be conveyed during the ageing and solidification thereof to a device, which cuts it up continuously.

As may be easily seen from the accompanying drawing, the apparatus consists of a box conveyor, which is supported on tracks placed preferably inside a well-ventilated chamber, the several boxes or sections A which conveyor, being arranged adjacent one another and consisting of only two side walls arranged parallel to the direction of motion of the conveyor and a bottom portion movable on hinges B of an endless chain, in order to be able to pass the driving chain wheels C and C' at the points of reversal. On the horizontal portion of the track G, the boxes nest up to each other in such a way that when they are in an upright horizontal position they form a long channel closed tight at the sides and the bottom, but open at the top. With dimensions of, for example, 2 metres for the breadth, 0.75 metre for the height of the boxes and 10 metres for the length of the row of boxes standing upright against each other a channel of about 15 cubic metres volume is available, over one end of which the stirring vessel D is located and at the other end of which the arrangement for cutting up the solidified phosphate is placed. As the stirring vessel D sends down the mixture of crude phosphate and sulphuric acid into the channel as a thin paste, the box conveyor A is raised up for a short distance at the end over which the stirring vessel is located, in order to prevent the paste from running out rearwardly in such direction. The paste spreads out in the opposite direction, that is, in the direction of the arrow shown in the drawing, until it is prevented from spreading further by the superphosphate which has already solidified.

The upper run of the box conveyor moves at a slow adjustable speed towards the cutting apparatus E, the speed being so regulated that the mass of phosphate and sulphuric acid, when it reaches the cutting apparatus, has passed through the reaction of ageing and has solidified sufficiently to be capable of being cut. A distinctive feature of the type of conveyor employed is that by the shape of the straightening out position of the conveyor from the point where the pasty mass is flowed thereon such straightening out aids materially in providing a thoroughly opened-up surface of the mass for engagement later by the cutting edges. The necessary motion of the conveyor boxes results in an agitation of the pasty mass which aids the opening-up process.

The cutting apparatus may consist of one or more knives, which rotate or which may move in some other direction, or instead comprise stretched wires or scraper buckets. In conjunction with the box conveyor, which forms an endless band, such cutting apparatus permits of continuous working.

Just as it is adapted for conveying mixtures of crude phosphate and sulphuric acid, the new apparatus is suitable for the handling of any other similar pasty material which is to be cut up after it has solidified.

I claim:

1. A method of ageing and disintegrating pasty superphosphate masses comprising the step of continuously flowing the solidifying pasty mass upon an endless conveyor whose one end away from the direction of conveyance is tilted upwardly with a straightening out portion in the direction of conveyor travel, the speed and length of such conveyor being so regulated that disintegrating apparatus can be applied to the mass after the ageing process is completed.

2. An apparatus for ageing and disintegrating pasty superphosphate masses comprising a conveyor having an endless series of communicating receptacles, the end of said conveyor at the point substantially where the paste is applied being inclined upwardly.

3. An apparatus for ageing and disintegrating pasty superphosphate masses, comprising a conveyor having an endless series of communicating receptacles, the end of said conveyor at the point substantially where the paste is applied being inclined upwardly, and means at the delivery end for disintegrating the mass.

4. An apparatus for ageing and disintegrating pasty superphosphate masses comprising a conveyor having an endless series of communicating receptacles, the end of said conveyor at the point substantially where the paste is applied being inclined upwardly, said receptacles comprising bottoms with tightly engaging side walls.

5. An apparatus for ageing and disintegrating pasty superphosphate masses comprising a conveyor having an endless series of communicating receptacles, the end of said conveyor at the point substantially where the paste is applied being inclined upwardly, said receptacles comprising bottoms with tightly engaging side walls and means at the delivery end for disintegrating the mass.

6. A method of ageing and disintegrating pasty superphosphate masses comprising the step of continuously flowing the pasty mass into a relatively thin layer and then disintegrating the older mass as soon as sufficient solidification has set in after the ageing process.

7. A method of ageing and disintegrating pasty superphosphate masses comprising the step of continuously flowing the solidifying pasty mass into a relatively thin layer causing a distortion of such pasty mass during the period of ageing and then disintegrating the older mass as soon as sufficient solidification has set in after the ageing process.

8. A method of ageing and disintegrating pasty superphosphate masses comprising the step of continuously flowing the pasty mass into a relatively thin layer causing a distortion of such pasty mass during the period of ageing and flowing new material upon such distorted mass and then disintegrating the older mass as soon as sufficient solidification has set in after the ageing process.

9. A method of ageing and disintegrating pasty superphosphate masses comprising the step of flowing the pasty mass into the form of a layer, causing a distortion of such pasty mass during the period of ageing and then flowing new material upon such distorted mass.

10. A method of ageing and disintegrating pasty superphosphate masses comprising the step of flowing the pasty mass into the form of a layer, causing a distortion depthwise of such pasty mass during the period of ageing and then flowing new material upon such distorted mass.

The foregoing specification signed at Germany.

DR. G. A. BRUHN.

In presence of—
KEINRICH NAGEL,
MINNA WENZEL.